Figure 1:
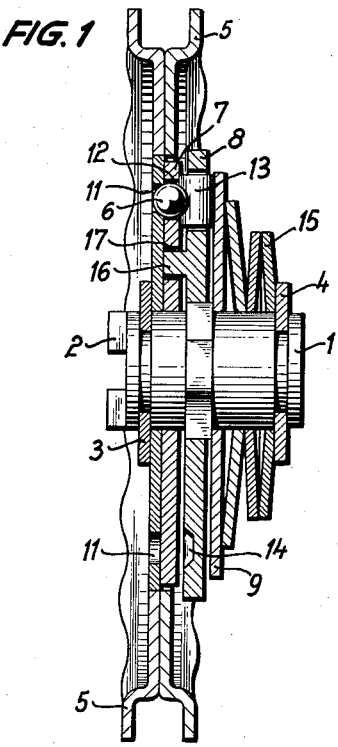

Jan. 24, 1961  R. LANGHECK  2,969,133
OVERLOAD CLUTCH
Filed Oct. 22, 1958

INVENTOR
Richard Langheck
BY
Michael E. Striker
Attorney

United States Patent Office 2,969,133
Patented Jan. 24, 1961

2,969,133

OVERLOAD CLUTCH

Richard Langheck, Niefern, Baden, Germany, assignor to Wilhelm Sihn, Jr., K.G., Niefern, Baden, Germany, a firm Filed Oct. 22, 1958, Ser. No. 768,992

Claims priority, application Germany Oct. 23, 1957

5 Claims. (Cl. 192—56)

The invention relates to overload clutches, and more particularly, to overload clutches of a type in which engagement between a driving and a driven member is completely broken by an overload so that the driving and driven members may freely move relative to each other until engagement is restored by reversing the driving member.

It is an object of the present invention to provide an overload clutch in which the connection between the driving and driven member is provided by at least one connecting ball serving as a releasable wedge between the driving and driven member.

Another object of the invention is the provision of such a clutch in which the relative positions of the connecting balls and at least one of the driving and driven members are positively controlled within predetermined limits.

Yet another object is the provision of such a clutch in which such control is achieved with a minimum of wear of the ball.

An additional object of the invention is to provide an overload clutch with a large number of such connecting balls so as to distribute a load evenly among such balls.

A further object of the invention is the provision of an overload clutch having a plurality of connecting balls in which the relative positions of such connecting balls are precisely determined at all times.

Figure 2:
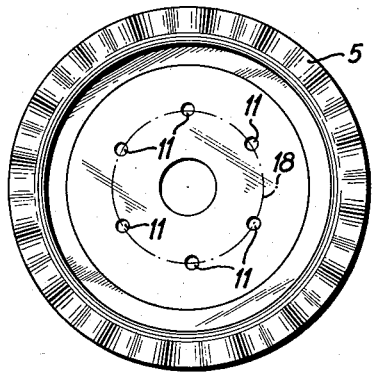
Figure 5:
Figure 3:
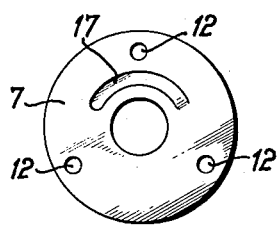
Figure 4:
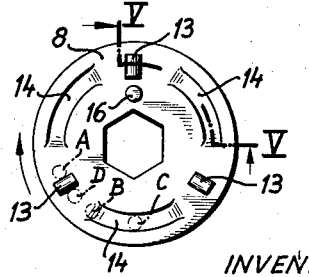

Other objects and many of the attendant advantages of this invention will be readily appreciated as the same becomes better understood by reference to the following detailed description when considered in connection with the accompanying drawing, in which like reference numerals designate like parts throughout the figures thereof, and wherein:

Fig. 1 is an axial section through an embodiment of the overload clutch of the invention, Fig. 2 is a front view of the device of Fig. 1 on a reduced scale, Fig. 3 is a front view of an element of Fig. 1 on the scale of Fig. 2, Fig. 4 is a front view of another element of the device of Fig. 1 on the scale of Fig. 2, and Fig. 5 is a fractional sectional view of the element of Fig. 4 along line V—V.

The overload clutch of the invention generally comprises a driving disc adapted to be connected to a driving member and a driven disc adapted to be connected to a driven member, the discs being arranged coaxially with their front faces facing each other. At least one of the discs is resiliently held so that the front faces of the disc may be resiliently forced apart. At least one ball-engaging overload means is provided on the front face of one of the discs and consists of two arcuate grooved portions arranged coaxially and equidistant from the center of the disc, the grooves having two ends being farthest from each other, and a projection between the groove portions projecting toward the other disc. Ball-engaging means are arranged on the other disc at the same radial distance from the center of the other disc as the ball-engaging overload means on the first-mentioned disc. A connecting ball is arranged in one of the grooved portions between the front faces of the discs and has a diameter smaller than the distance between the bottom of the grooved portions and the ball-engaging means on the other disc and slightly larger than the distance between the crest of the projection between the grooved portions and the ball-engaging means on the other disc. When the discs rotate relative to each other, the ball is engaged by the projection and connects the discs to each other. The ball can move past the projection into the other grooved portion only in the event of an overload which permits the ball to force the two discs apart. Blocking means are associated with the first-mentioned disc, and positively engage and hold the ball so as to limit the movement of the ball in the grooved portion in such a manner that the ball is blocked before it reaches the far end of the grooved portion. The ball is thus prevented from reaching the far end and from becoming wedged between this end and the ball-engaging face of the other disc.

Referring now to the drawing and particularly to Fig. 1, there is shown a driving shaft 1 adapted to be connected to driving means by a jaw coupling 2. A number of concentric elements are held on driving shaft 1 between two resilient horseshoe-shaped lock washers 3 and 4 which engage mating annular grooves on shaft 1.

A driven wheel or disc 5 is rotatably mounted on driving shaft 1 and is axially slidable thereon. The driven wheel 5 is formed with a sheave for connection to a driven member by means of a belt or the like. The driven wheel 5 has a number of openings 11 arranged concentrically for engagement with balls 6. Openings 11 are of a diameter somewhat smaller than that of balls 6 so that the balls may engage the openings but may not pass therethrough. The arrangement of the openings 11 on driven wheel 5 is best seen in Fig. 2 which is a front view of the device of Fig. 1. The openings 11 are shown to be arranged on a circle 18 about the axis of wheel 5.

A ball cage disc 7 is arranged adjacent driven wheel 5 and in frictional contact therewith. Cage disc 7 is rotatable and axially movable on driving shaft 1. It is formed with a plurality of openings 12 best seen in Fig. 3, in which the balls 6 are held. The openings 12 have a diameter slightly larger than that of balls 6 so that the balls may freely move in openings 12 in an axial direction.

As best seen from Figs. 2 and 3, the openings 12 in ball cage disc 7 are equally spaced about the center of the disc on a common circle of equal radius as circle 18 on which the openings 11 of driven wheel 5 are arranged. The spacing of openings 12 is such that all of them are in alignment with corresponding openings 11 of wheel 5 in a plurality of relative angular positions of ball cage disc 7 and wheel 5. As seen in Fig. 3, disc 7 is formed with an arcuate slot 17 concentric with the circle on which the openings 12 are located but of smaller radius of curvature, the angular length of slot 17 along its curvature being substantially equal to the angular distance between any two of openings 12 as measured along the circle on which openings 12 are located.

A driving disc 8 is secured on driving shaft 1 against relative rotation by a central hexagonal opening in disc 8 engaging a hexagonal portion of driving shaft 1 and is axially movable thereon. Disc 8 carries a pin 16 in engagement with arcuate slot 17 of ball cage disc 7 so that relative rotation of driving disc 8 and ball cage disc 7 is angularly limited to the length of slot 17.

A number of bearing rollers 13 are arranged in recesses of driving disc 8 so as to be rotatable about the respective axes which are radially arranged relative to driving disc 8. As best seen in Fig. 4, the bearing rollers 13 are arranged on a common circle having the same radius as circle 18 on wheel 5 and as the circle on which the openings 12 in disc 7 are located. Bearing rollers 13 are angularly offset relative to each other by the same distance as openings 12 in ball cage disc 7.

Concentric grooves are arranged between bearing rollers 13 along the common circle of the latter and are symmetrically shaped in such a manner as to have a deepest bottom portion between adjacent bearing rollers 13 and to decrease in depth from that deepest bottom portion towards the rollers, as best seen in Fig. 2.

Driving disc 8 is limited in its axial movement by a backing disc 9 rotatable and axially movable on driving shaft 1 between the hexagonal portion of the shaft and the lock washer 4. Backing disc 9 is urged against driving disc 8 by three spring washers or disc springs 15 which abut against lock washer 4. Bearing rollers 13 engage backing disc 9 and are urged by the resilient pressure of spring washers 15 against ball cage disc 7 for frictional engagement of the cage disc 7 with driving wheel 5.

The grooves 14 in driving disc 8 are of such a depth that a ball 6 when partly located in the deepest bottom portion of groove 14 will project into the opening 12 of cage disc 7 so as to be held therein against angular displacement but will not project beyond the axial thickness of cage disc 7 for frictional engagement under pressure with driven wheel 5 along circle 18. When the ball 6 is located in the portion of groove 14 adjacent one of bearing rollers 13, and this portion of the groove is actually flush with the surface of driving disc 8, as evident from Fig. 5, the ball projects through the opening 12 in disc 7 so as to engage opening 11 in wheel 5 and to connect cage disc 7 to wheel 5 for joint rotary movement about the axis of driving shaft 1.

The afore-described device operates as follows:

In the disconnected position of the overload clutch of the invention, a ball 6 is located in the deepest bottom portion of each of the grooved portions 14 as indicated at C in Fig. 4. All balls are held in the corresponding portions of the respective grooves 14 by the ball cage disc 7. The following description will be limited to one ball and it will be understood that because of the positive spacing of the balls by the corresponding openings 12 in disc 7, all balls 6 of the clutch will be positively located at corresponding relative locations on driving disc 8 at the same time.

Pin 16 of driving disc 8 is in engagement with one end of slot 17 of ball cage disc 7. There is no relative movement of discs 7 and 8. Because of the location of ball 6 in the deepest portion C of groove 14, the ball does not project from ball cage disc 7 toward driven wheel 5. The ball cage disc is thus able to move relative to driven wheel 5 and the frictional contact between the two members under any conditions of load is too small that the driven wheel could be taken along by the ball cage disc.

When the direction of movement of shaft 1 is reversed, the pin 16 is at first free to move in slot 17 away from engagement with the end of the slot. The friction between the contacting surfaces of cage disc 7 and driven wheel 5 being greater than that between cage disc 7 and driving wheel 8 because of the bearing rollers 13 interposed between the driving disc 8 and the cage disc 7, movement of cage disc 7 is retarded or stopped by frictional engagement with the driven wheel 5, pin 16 moves from engagement with the end of slot 17 in cage disc 7 towards the center of the slot, and ball 6 is moved away from its initial position in the direction of the arrow.

Displacement of the ball from the deepest center portion of groove 14 to position B causes it to exert pressure on driven wheel 5 as the ball travels along circle 18, and finally to engage one of the openings 11 in the disc, thereby coupling the ball cage disc 7 to the wheel 5 for joint movement. The resistance of the load applied to driven wheel 5 causes ball 6 to travel along driving disc 8 until it reaches position D adjacent projecting roller 13. The coupling is now in engagement and movement is transmitted from the driving shaft 1 to the driven wheel 5 by means of connecting ball 6 abutting against bearing roller 13 while pin 16 is substantially in the center of the arc of slot 17 and is inactive.

When the load applied to driven wheel 5 exceeds a certain predetermined value, the ball 6 is wedged between the slanting cylindrical surface of bearing roller 13 and driven wheel 5. The connecting ball 6 will move over the crest of the projecting portion of roller 13, will displace driving disc 8 and backing disc 9 against the restraint of spring washers 15 and will slip to the other side of roller 13 into the adjoining other groove 14 which is simultaneously abandoned by another ball previously held therein. Ball 6 will proceed under the torsional force of the load applied to wheel 5 until the ball reaches the bottom portion of the other groove 14 and loses engagement with driven wheel 5. It cannot move further because of engagement of pin 16 with the end of slot 17. The clutch is now in the free-wheeling position and will not, on its own, engage for drive of wheel 5 by shaft 1 in the original direction.

It is thus seen that any load applied to driven wheel 5 greater than a predetermined one will cause the clutch to uncouple the prime mover which may be connected to driven shaft 1 and prevent any damage thereto which may be caused by the overload, such as the overheating and burning out of windings in an electric motor.

The clutch in the free-wheeling position of the coupling is now in a position similar to the original one, but with pin 16 located at the opposite end of arcuate slot 17 and transmitting movement from the driven shaft 1 to ball cage disc 7 so that there is no relative movement between discs 7 and 8, and no effective coupling between disc 7 and wheel 5.

When the direction of movement of shaft 1 is reversed, the clutch will be engaged for movement in the opposite direction in the same manner as indicated above and the same cycle of events is initiated in the same order but in the opposite direction.

It is thus possible after an overload has caused the clutch to disengage, to re-engage it by reversing the direction of movement of the driving shaft briefly while braking or otherwise overloading the driven wheel 5 whereupon the clutch will reset itself ready for operation in the original direction until an overload is again applied.

While the terms "driving" and "driven" have been applied respectively to shaft 1 with disc 8 and to wheel 5, it will be understood that these terms have been used only by way of example and that the clutch of the invention being entirely symmetrical in its mode of motion transmission may equally be connected to a power transmitting train in such a manner that the shaft is connected to the driven element of the power train and wheel 5 to the prime mover without in any way departing from the spirit and scope of this invention. As long as consistently employed, the terms "driving" and "driven" are interchangeable for the purposes of this invention.

Because of the various structural features enumerated and described above, the positions of all the connecting balls relative to the ball-engaging overload means on the driving disc 8 of the overload clutch of the invention are identical at all times. The force transmitted by the overload clutch of the invention is thus equally applied to all the connecting balls and wear of the balls is held to a minimum. Since the balls are aligned in a predetermined manner relative to each other at all times, friction between the balls and the driven wheel is employed for transmitting torque from the driving shaft 1 to the driven wheel 5 only during the very short period of time until the balls engage coordinated openings 11 of wheel 5. It is only during this very short period that such friction can have a distorting effect on the shape of the balls, and this effect is further minimized by the fact that the balls during this period only gradually approach the shallowest portion of groove 14 and drop into openings 11 of wheel 5 when the shallowest portion is reached. The balls are engaged in openings 11 along a contact circle by the wheel so that distortional forces set up between the wheel and the balls are virtually non-existent.

Because of these and other advantages of the overload clutch of the invention which will be obvious to those skilled in the art from the details of the preferred embodiment thereof, wear of the connecting balls of the invention is extremely slow, and the device has a long useful life without requiring replacement of the balls or other maintenance operations due to wear of elements in frictional contact with the connecting balls.

It should be understood, of course, that the foregoing disclosure relates to only a preferred embodiment of the invention and that it is intended to cover all changes and modifications of the example of the invention herein chosen for the purpose of the disclosure, which do not constitute departures from the spirit and scope of the invention set forth in the appended claims.

What is claimed and desired to be protected by Letters Patent of the United States is:

1. In an overload clutch, in combination, a driving disc having a front face and adapted to be connected to a driving member; a driven disc having a front face and adapted to be connected to a driven member, said discs being arranged coaxially with their front faces facing each other; means for urging at least one of said discs toward the other disc; at least one ball-engaging overload means on the front face of one of said discs, said ball-engaging overload means comprised of two arcuate grooved portions arranged coaxially and equidistant from the center of said disc, and a projection between said grooved portions projecting toward the other disc; ball-engaging means arranged on the other disc at the same radial distance from the center of said other disc as said ball-engaging overload means on said one disc; a connecting ball arranged in one of said grooved portions between said facing faces of said discs and having a diameter smaller than the distance between the bottom of said grooved portions and the ball-engaging means on said other disc and slightly larger than the distance between the crest of said projection and said ball-engaging means on said other disc, whereby during rotation of said discs relative to each other said ball will be engaged by said projection connecting said discs to each other and will be adapted to move past said projection into the other grooved portion only in the event of overload; blocking means positively engaging and holding said ball; and abutment means for limiting relative turning movement between said blocking means and said one disc so that movement of said ball in said grooved portions is limited in such a manner that said ball is blocked before it engages an end of said arcuate grooved portions remote from said projection so as to prevent said ball from becoming wedged between said one disc and the ball engaging face of said other disc.

2. In an overload clutch, in combination, a driving disc having a front face and adapted to be connected to a driving member; a driven disc having a front face and adapted to be connected to a driven member, said discs being arranged coaxially with their front faces facing each other; means for urging at least one of said discs toward the other disc; a plurality of ball-engaging overload means on the front face of one of said discs, said ball-engaging overload means each comprised of two arcuate grooved portions arranged coaxially and equidistant from the center of said disc, and a projection between said grooved portions projecting toward the other disc; ball-engaging means arranged on the other disc at the same radial distance from the center of said other disc as said ball-engaging overload means on said one disc; a connecting ball arranged in one of said grooved portions of each of said ball-engaging overload means between said facing faces of said discs and having a diameter smaller than the distance between the bottom of said grooved portions and the ball-engaging means on said other disc and slightly larger than the distance between the crest of said projection and said ball-engaging means on said other disc, whereby during rotation of said discs relative to each other said balls will be engaged by said projections connecting said discs to each other and will be adapted to move past said projections into the other grooved portions only in the event of overload; blocking means including a ball cage member interposed between said discs coaxial with the same and movable in axial direction, said ball cage member positively engaging and holding said balls; and abutment means on said cage member and on said one disc for limiting relative turning movement between said cage member and said one disc so that movement of said balls in said groove portions is limited in such a manner that said balls are blocked before they engage an end of said arcuate grooved portions remote from said projection so as to prevent said balls from becoming wedged between said one disc and the ball engaging face of said other disc.

3. In an overload clutch, in combination, a driving disc having a front face and adapted to be connected to a driving member; a driven disc having a front face and adapted to be connected to a driven member, said discs being arranged coaxially with their front faces facing each other; means for urging at least one of said discs toward the other disc; a plurality of ball-engaging overload means on the front face of one of said discs, said ball-engaging overload means each comprised of two arcuate grooved portions arranged coaxially and equidistant from hte center of said disc, and a projection between said grooved portions projecting toward the other disc, the projections of said plurality of overload means being spaced about the center of said disc at equal angular distances along a common circle; ball-engaging means arranged on the other disc at the same radial distance from the center of said other disc as said ball-engaging overload means on said one disc; a connecting ball arranged in one of said grooved portions of each of said ball-engaging overload means between said facing faces of said discs and having a diameter smaller than the distance between the bottom of said grooved portions and the ball-engaging means on said other disc and slightly larger than the distance between the crest of said projection and said ball-engaging means on said other disc, whereby during rotation of said discs relative to each other said balls will be engaged by said projections connecting said discs to each other and will be adapted to move past said projections into the other grooved portions only in the event of overload; blocking means comprising a ball cage member interposed between said discs and coaxially movable relative thereto, a plurality of cage openings being formed in said cage member for engaging and holding said balls, said openings being spaced about the center of said cage member at said equal angular distances, and abutment means on said cage member and said one disc for limiting relative movement of said one disc and said cage member to an angular distance substantially equal to one of said equal angular distances to prevent said balls from becoming wedged between said driving disc and the ball-engaging face of said other disc.

4. In an overload clutch, in combination, a driving disc having a front face and adapted to be connected to a driving member; a driven disc having a front face and adapted to be connected to a driven member, said discs being arranged coaxially with their front faces facing each other; means for urging at least one of said discs toward the other disc; a plurality of ball-engaging overload means on the front face of one of said discs, said ball-engaging overload means each comprised of two arcuate grooved portions arranged coaxially and equidistant from the center of said disc and a cylindrical rotary member mounted on said one disc for rotation about an axis extending radially thereof and forming a projection between said grooved portions projecting toward the other disc for rolling contact therewith; means supporting said rotary member against movement in axial direction relative to said one disc in a direction away from said other disc; ball-engaging means arranged on the other disc at the same radial distance from the center of said other disc as said ball-engaging overload means on said one disc; a connecting ball arranged in one of said grooved portions of each of said ball-engaging overload means between said facing faces of said discs and having a diameter smaller than the distance between the bottom of said grooved portions and the ball-engaging means on said other disc and slightly larger than the distance between said rotary member and said ball-engaging means on said other disc, whereby during rotation of said discs relative to each other said balls will be engaged by said rotary members and will be adapted to move past said rotary members into the other grooved portions only in the event of overload; blocking means including a ball cage member interposed between said disc coaxial with the same and movable in axial direction, said ball cage member and positively engaging and holding said balls; and abutment means on said cage member and on said one disc for limiting relative turning movement between said cage member and said one disc so that movement of said balls in said groove portions is limited in such a manner that said balls are blocked before they engage an end of said arcuate grooved portions remote from said projection so as to prevent said balls from becoming wedged between said one disc and the ball engaging face of said other disc.

5. An overload clutch, in combination, a driving shaft; first and second disc means adjacently mounted on said shaft for axial movement thereon, one of said disc means being secured on said shaft against rotation relative thereto, the other one being rotatable on said shaft; pin means mounted on one of said disc means, the other of said disc means being formed with a concentric arcuate recess therein for engagement with said pin means, the arc of said recess being of predetermined angular length; a projection on said first disc means spaced from the center thereof, said first disc means being formed with two arcuate depressions arranged on a common circle concentric with said disc and passing through said projection, said depressions being arranged on opposite sides of said projection, each having a deepest portion and tapering in depth therefrom along said arc, the respective deepest portions of said depressions being spaced apart along said common circle an angular length equal to said predetermined angular length; a ball member movable along said common circle, said second disc means being formed with an axial bore therein for holding said ball member, said bore being aligned with said projection when said pin means is substantially centered in said arcuate recess; a driven member rotatable on said shaft adjacent said second disc means and formed with an opening alignable with said bore in said second disc means, said ball member being of such diameter, and said disc means and said driven member being so shaped and arranged that said ball member, when positioned on said common circle contiguously adjacent said projection, extends through said bore into the aligned opening in said driven member, and when positioned in one of said deepest portions of said depressions, is out of pressure abutment against said driven member; and resilient pressure means for axially pressing said disc means and said driven member against each other.

References Cited in the file of this patent
UNITED STATES PATENTS

| | | |
|---|---|---|
| 2,490,172 | Swahnberg | Dec. 6, 1949 |
| 2,819,635 | Better et al. | Jan. 14, 1958 |